United States Patent [19]

Ernst

[11] Patent Number: 4,938,319

[45] Date of Patent: Jul. 3, 1990

[54] LINEARLY ADJUSTABLE FORCE TRANSFER ELEMENT WITH STEPLESS INERTIA-SENSITIVE BLOCKING

[76] Inventor: Hans-Hellmut Ernst, Bismarckallee 50, D-2070 Ahrensburg, Fed. Rep. of Germany

[21] Appl. No.: 269,330

[22] Filed: Nov. 10, 1988

[30] Foreign Application Priority Data

Nov. 14, 1987 [DE] Fed. Rep. of Germany ....... 3738797

[51] Int. Cl.⁵ .......................... G05G 7/14; B60N 1/00; B60R 21/32
[52] U.S. Cl. ...................................... 188/67; 188/135; 280/806; 297/478
[58] Field of Search .......................... 188/135, 136, 67; 73/514; 297/216, 480, 470, 478, 479, 473; 280/806

[56] References Cited

U.S. PATENT DOCUMENTS

| | | | |
|---|---|---|---|
| 3,893,730 | 7/1975 | Homier et al. | 188/67 X |
| 4,135,410 | 1/1979 | Filderman | 280/806 |
| 4,221,403 | 9/1980 | Grosser | 280/806 |
| 4,323,204 | 4/1982 | Takada | 280/806 X |
| 4,378,915 | 4/1983 | Föhl | 297/478 X |
| 4,387,926 | 6/1983 | Van Eerden et al. | 188/67 X |
| 4,552,405 | 11/1985 | Wiers | 188/67 |

FOREIGN PATENT DOCUMENTS

| | | | |
|---|---|---|---|
| 2310839 | 11/1972 | Fed. Rep. of Germany | 297/478 |
| 2733122 | 2/1979 | Fed. Rep. of Germany | 297/478 |
| 2817214 | 10/1979 | Fed. Rep. of Germany | . |
| 1350064 | 11/1987 | U.S.S.R. | 280/806 |

Primary Examiner—Andres Kashnikow
Assistant Examiner—Matthew C. Graham
Attorney, Agent, or Firm—Pollock, Vande Sande & Priddy

[57] ABSTRACT

A linearly adjustable force transfer element with one or more inertia-sensitive triggering mechanisms for one or two stepless, activatable blocking devices especially adapted for use with a car seat. A vertically adjustable seat frame and optionally safety belt hardware is fastened to a mounting eye of a draw rod and a bottom mounting eye is fastened to the carriage of the seat rail. In normal use, the two parts can be freely moved with respect to one another; however, in a front end collision, an inertia sensor mass travels and by means of a pressure cam tilts plates into a blocking position, which is achieved immediately, directly and steplessly. A force transfer is possible by means of the two opposing blocked parts so that adjusting elements of the seat are not loaded. The described sensor mechanism can also be combined with other sensors, e.g. a draw-out sensitive release element, and a spherical sensor, which can be addressed on all levels of deceleration, can be used. The use of plates as a blocking element provides stepless, and immediate locking of the two parts against movement relative to each other.

13 Claims, 4 Drawing Sheets

LINEARLY ADJUSTABLE FORCE TRANSFER ELEMENT WITH STEPLESS INERTIA-SENSITIVE BLOCKING

The invention relates to a stepless, adjustable force transfer element with inertia-sensitive blocking. Such elements can e.g. be used as restraining devices for linearly displaceable masses, particularly for seats of passenger vehicles.

The seats of passenger vehicles are equipped adjustably with electrically driven adjusting systems or manually actuatable gear-locking systems in order to adjust the seat in the desired position in the longitudinal direction of the vehicle and to adjust the backrest angle. However, the forces, which can be absorbed by these very simply designed adjusting systems due to cost and weight, are too small to prevent the seat from disengaging from the holders at the provided vehicular points when the speed of the vehicle suddenly changes as during emergency braking or accidents, particularly in the case of passenger retaining means (safety belt) engaging at the seat or at the seat bracket.

The object of the invention is to arrest immediately, directly and steplessly a linearly displaceable mass provided with simple drive means (e.g. seat in a vehicle) when the speed changes unexpectedly and dramatically (accident case) in its respective current position relative to the environment by means of load-absorbing force transfer elements.

This problem is solved by the invention by means of measures indicated in the characterizing part of patent claim 1. Advantageous embodiments of the invention result from the dependent claims.

SUMMARY OF THE INVENTION

Thus with the invention a device is created that in the case of danger (accident) - in addition to the adjusting system - arrests load-transferring in its respective position a displaceable mass (vehicle seat with passenger) relative to the vehicle cell. This arresting occurs directly, thus steplessly as a clamping block of plates on a load carrier (a draw rod usually). In this case the blocking is triggered by sensor masses addressing inertia-sensitive decelerations/accelerations.

A few embodiments of the invention are illustrated in the drawings.

DESCRIPTION OF THE PREFERRED EMBODIMENT

The example illustrates a car seat in which the safety belt is completely integrated. In an accident enormous forces have to be transferred here from the seat to the cell of the car. Of course, this puts large demands on the mechanically or electrically actutable seat adjusting elements. Adequate dimensioning of these adjusting and drive elements for the force flow in the case of a crash would result in enormously heavy, voluminous, and expensive components.

Figure 1:
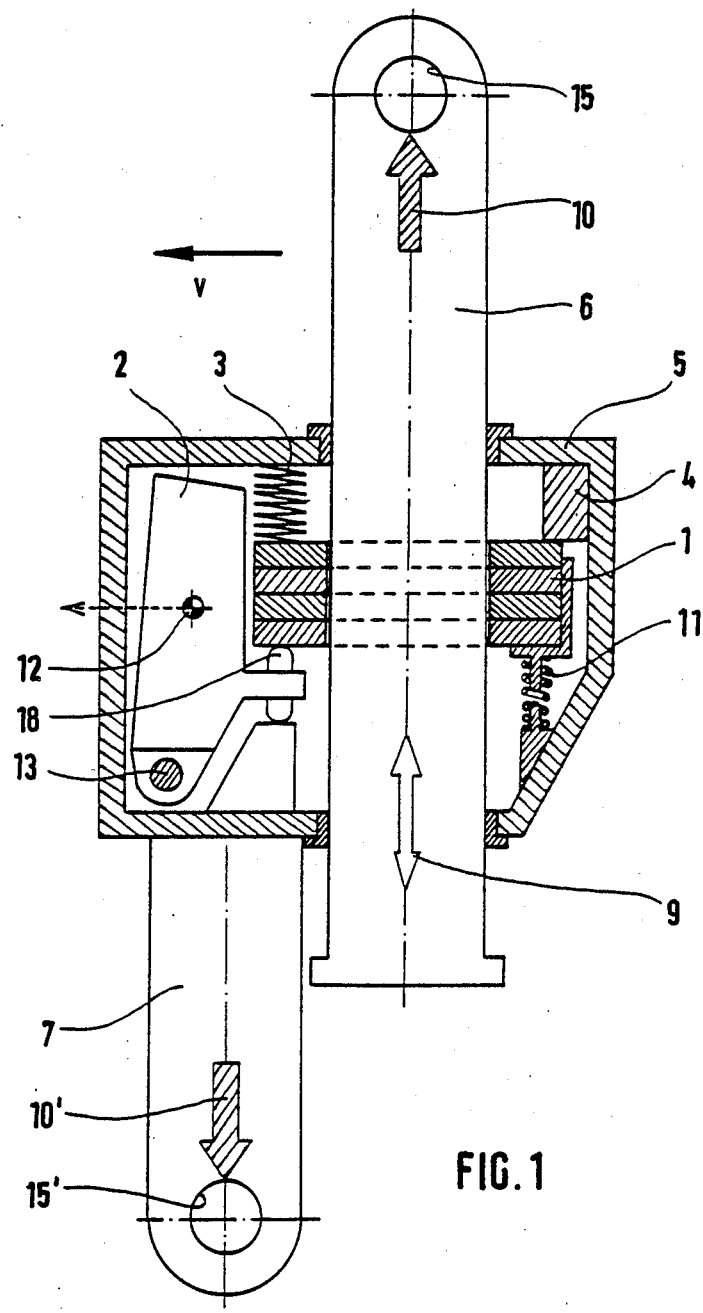
FIG. 1 shows a vertically adjustable force transfer element.

At this point a logical application of the present invention commences. The force transfer element of FIG. 1 is mounted e.g. in connection with the vertical seat adjustment with its upper mounting eye 15 of the draw rod 6 on the right and on the left of the rear seat frame. The lock and the lap belt end assembly hardware of the safety belt can also be fastened at the same mounting eye 15.

The bottom mounting eye 15' of the load carrier 7, which with the housing 5 belongs to the force transfer element, is fastened at the carriage, which can be linearly traversed on the seat rail. In the normal state of use, upon driving the seat up and down, the draw rod 6 is traversed with ease of motion by the force transfer element. Draw rod 6 and load carrier 7 are moved relative to one another without any remarkable resistance.

In the case of an accident, frontal crash, the object is to absorb the enormous mass deceleration forces 10 by means of the then blocking force transfer element and to guide safely into the floor of the vehicle by means of the seat rail. This blocking process runs as follows: The deceleration forces also act on the center or mass 12 of the sensor mass 2 in the direction of travel=direction of impact v. In this case the sensor mass 2 pivots out of its position of rest to the left and tilts by means of the pressure cam the plates that are combined into a package. At the same time the force of the sensor spring 3 determines at which threshold of deceleration (e.g. 1.5 g) the blocking is introduced. The plates 1 are tilted into the blocking state directly and steplessly, thus without path loss. That is, when the pull-out force 10 is present in the draw rod 6, no path-related draw-out takes place, as would be the case with a known sawtooth latching device. The sloped positioned plates immediately absorb the load and guide it by means of the stop 4 into the housing 5. From there it arrives by means of the load carrier 7 into the not-illustrated carriage of the vertical seat adjustment. Following the unloading, all parts return into the illustrated position of rest.

The possible uses of such a force transfer element are applicable in any situation where masses are uniformly displaced and when there is unusual change in motion, blocking is to follow. In this case the description of it use for a car seat is to be understood as an up-to-date and logical example.

Figure 2:
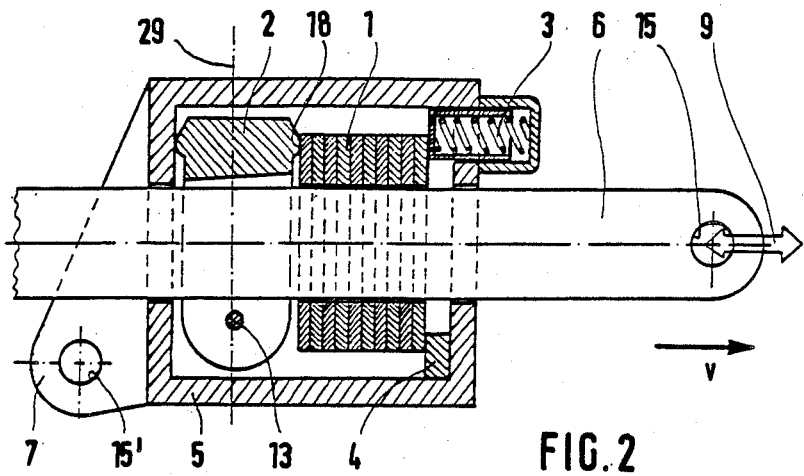
FIG. 2 shows a horizontally adjustable force transfer element in non-blocked position.
Figure 3:
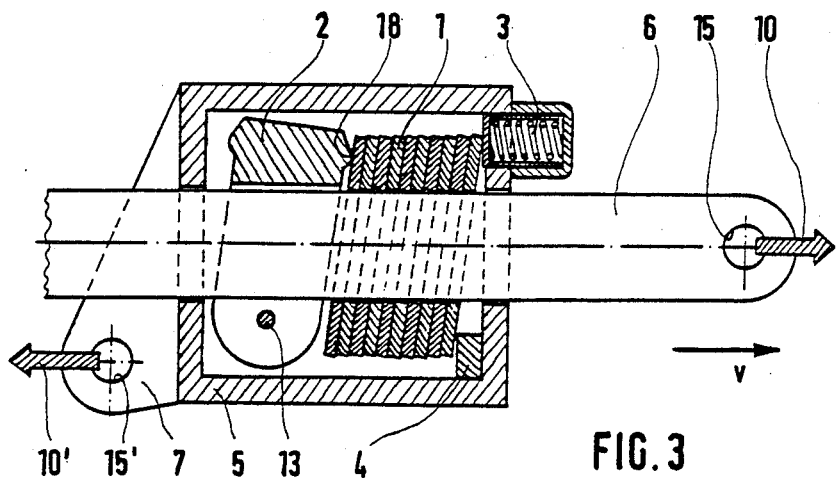
FIG. 3 shows the element of FIG. 2 in blocked position.

The FIGS. 2 and 3 show a force transfer element for use in an instance where there is horizontal displacement. In order to stay with the example of the car seat, the draw rod 6 could be a load rail travelling with the seat upon longitudinal seat adjustment. Then the force transfer element would be connected to the mounting eye 15' to the floor of the vehicle.

In a frontal crash in direction v, the sensor mass 2 pivots to the right and tilts the plates 1 against the force of the sensor spring 3 into the blocking position. The forward directed forces 10 out of the seat are guided into the housing 5 by the pull rail 10 by means of the clamping plates 1 thus into the floor of the car. The adjusting and drive elements for the seat are not stressed and can, therefore, be designed light, small, and cost-effectively. Thus blocking can take place here not only upon rear end collison but also upon frontal crash.

The force transfer rod 6 can also be pre-loaded, if the force transfer element is equipped with a second package of plates at the axis of symmetry 29 on the left. Then the sensor mass 2 could pivot not only to the right but also to the left.

Figure 4:
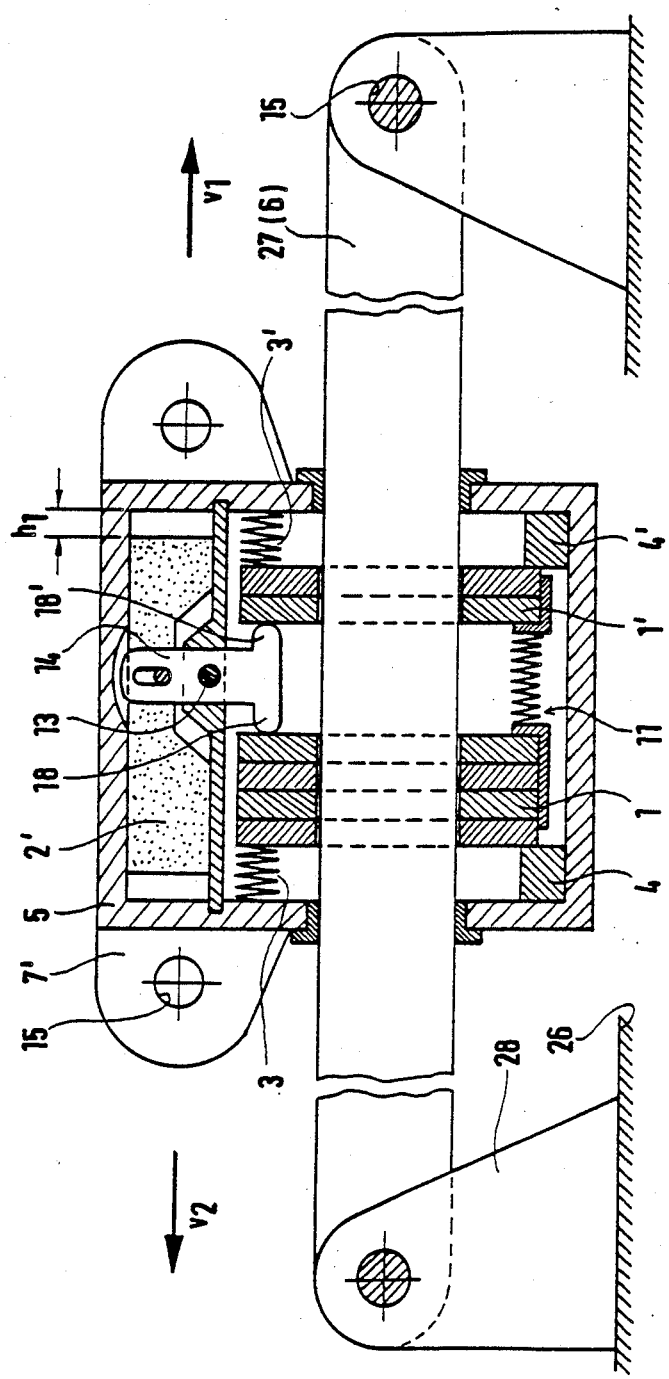
FIG. 4 shows a force transfer element within a longitudinal adjustment of a seat.

An inversion in movement of this system is illustrated in FIG. 4. Here the draw rod 6 is the seat rail 27, connected rigidly to the floor 26 of the car. The longitudinally adjustable carriage (not illustrated) is connected by means of the mounting eyes 15' to the blockable force transfer element. (Or the housing 5 itself is the longitudinally traversable carriage).

In the normal state of use, the carriage and thus the seat in the longitudinal direction $v_1$ (direction of travel) and $v_2$ (against the direction of travel) is steplessly traversed e.g. by a simple thread-spindle drive. No latching occurs. The low working forces can be absorbed by the adjusting drive.

In an accident a stepless (or better step-free blocking) of the force transfer element occurs. In the illustrated design, not only the impact forces of the rear end collison can be absorbed by means of 2 clamping plates 1 but also the impact forces of the more severe frontal crash can be absorbed by 4 plates 1. Here it is emphatically shown that the amount of the force to be transferred can be very simply controlled by the number of plates.

Here a heavy body that can be displaced linearly in the directions $v_1$ and $v_2$ serves as a sensor mass 2'. Said body is connected to a longitudinal hole of a sensor lever 14, which is fastened pivotably in the sensor position 13.

During a frontal crash the sensor mass 2' moves out in direction $v_1$ and takes the sensor lever 14 with it. Then the four plates 1 are tilted with the pressure cam 18 against the force of the sensor spring 3 and brought into the blocking position.

During a rear end collison the deceleration forces occur in the opposite direction, which are then intercepted correspondingly by the two blocked plates 1'.

Since a specific load can be transferred by means of the adjusting and drive elements of the seat at the beginning of the accident, there is time to activate the blocking in the force transfer element before a noticeable load is built up. Since the blocking occurs immediately, directly and steplessly by means of the plates, it is possible to transfer the load without meshing motion in the respective position.

The transfer of load from the respective position without path loss has many advantages:
The problem, which exists in the locking gear system, where the pawl must reliably find the tooth gap, does not exist here.
When a pawl locks against a tooth there is impact, which does not occur when the plates are blocked.
During an accident one should largely avoid displacing the passengers forward. In the case of the locking gear system, a movement on order of the tooth space takes place.
In the example of FIG. 4, automatic blocking takes place. No locking and unlocking with the therewith associated noises is required.

The introduction of an accident does not always occur in the direction of travel. Even a side crash can be the cause for a resulting front end collison.

For this case the use of a universal sensor, which can introduce blocking upon all decelerations of the plane and even upon rollover, is more meaningful.

Figure 5:
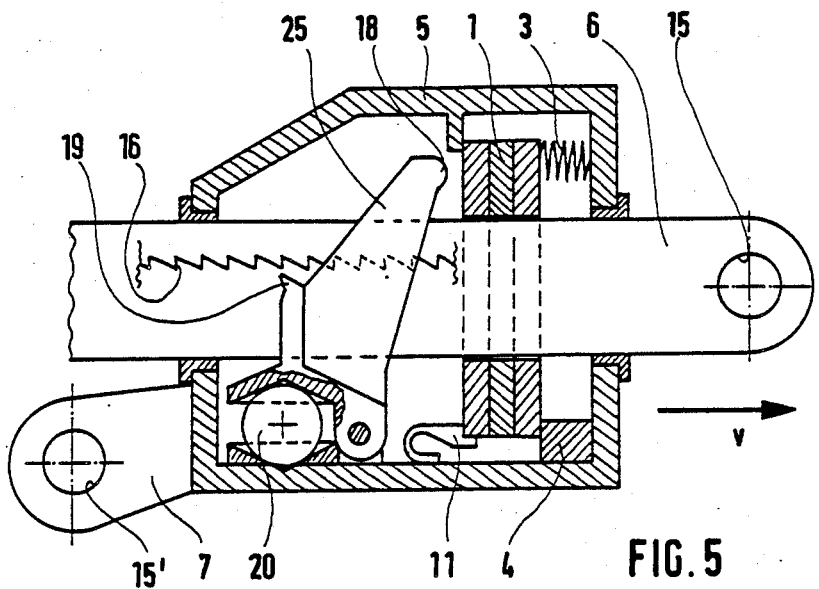
FIG. 5 shows a force transfer element with a ball sensor as a release mechanism.

FIG. 5 shows a force transfer element with such a sensor. The sensor sphere 20 is positioned as an inert mass between two inner conical surfaces, whereby the upper component is the pivotable blocking lever 25. The draw rod 6 has a laterally attached, additional locking gear system 16, which can comprise laterally stamped teeth or a plastic tooth strip.

In case of danger, the sensor sphere 20 travels out and lifts the blocking lever 25. In this manner the pawl 19 mates with the locking gear system 16 and the pressure cam abuts the plates 1. Then the load in the draw rod 6 is built up, satisfies a draw-out of approx. 2 mm, until the plates 1 are tilted into the blocking position and can transfer the load. Upon unloading an automatic deblocking sets in.

Figure 6:
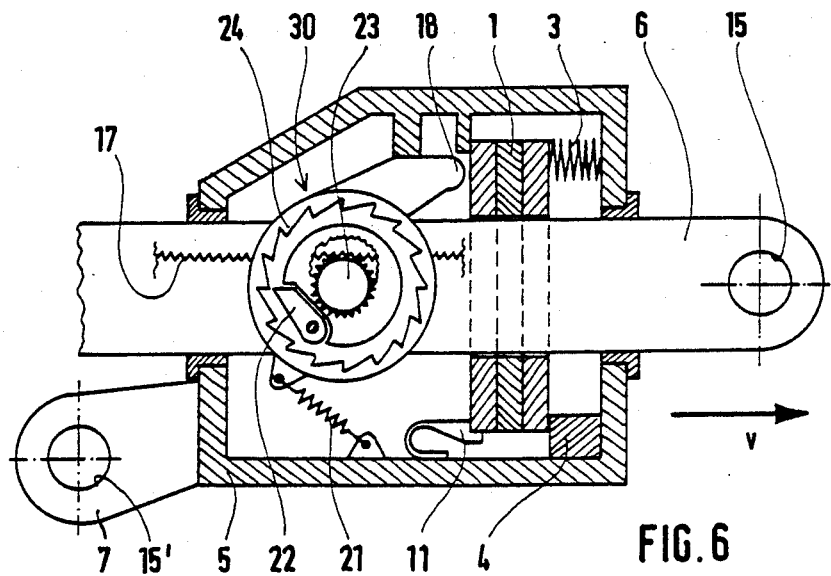
FIG. 6 shows a force transfer element with draw-out sensitive release system.

FIG. 6 shows another peculiarity in which independent of the direction of travel v and the direction of collison of the vehicle, a blocking in the force transfer element is triggerable. Here the cause for the introduction of blocking is the draw-out acceleration of the draw rod 6 in direction v. If in the draw-out movement a predetermined value for the acceleration is exceeded, the draw-out sensitive triggering element 30 reacts.

A known inertia system is driven by means of a pinion 23 by a travelling gear system 17, which is arranged laterally at the draw rod 6. For example, the U.S. Pat. No. 4,190,213 or the DE-OS 28 17 214 shows such a system. If the acceleration of the draw rod 6 exceeds a pre-determined value, a blocking pawl 22 travels out and meshes with a blocking gear. The triggering element 30 is rotated against a spring 21. At the same time the pressure cam 18 moves the plates in the upper region against the force of the sensor spring 3. They tilt and move into the blocking position.

Thus, in the case of this force transfer element the draw element 6 can be freely traversed with uniform speed. In an accident, with a sudden tug at the draw rod 6, a blocking of the plates 1 would be immediately introduced by the shortest path.

The different sensor systems for triggering a blocking in the force transfer element can also be combined so that doubly sensitive blocking systems can be installed.

For example, the combination of the design, according to FIGS. 5 and 6, yields an extremely universal and extremely reliable blocking system. All described systems can be combined one with the other.

I claim:

1. A linearly adjustable force transfer device having inertia-sensitive blocking means for intercepting heavy masses under deceleration forces, said device comprising:
   first and second load carriers that are linerally movable with respect to each other;
   at least one tiltable plate joined to said first load carrier for tilting movement for bearing against a surface of said second load carrier;
   a sensor mass mounted on said first load carrier for tilting said tiltable plate into frictional contact with said surface of said second load carrier upon application of a deceleration force on said force transfer device, thereby locking said load carriers together against linear movement with respect to each other; and
   sensor spring means mounted on said first load carrier and adapted for resisting movement of said sensor mass.

2. A linearly adjustable force transfer device according to claim 1, wherein said first and second load carriers are freely linearly movable with respect to each other in the absence of deceleration forces.

3. A linearly adjustable force transfer device according to claim 2, wherein first and second load carriers are adapted for loading when said load carriers are locked together.

4. A linearly adjustable force transfer device according to claim 2, wherein each of said load carriers is provided with a mounting eye.

5. A linealy adjustable force transfer device according to claim 1, wherein said first and second load carriers are adapted for loading when said load carriers are locked together.

6. A linearly adjustable force transfer device according to claim 1, wherein each of said load carriers is provided with a mounting eye.

7. A linearly adjustable force transfer device according to claim 6, wherein said at least one plate and an associated sensor spring means is mounted on each side of said sensor means.

8. A linearly adjustable transfer device according to claim 1, wherein said at least one plate and an associated sensor spring means is mounted on each side of said sensor mass.

9. A linearly adjustable force transfer device according to claim 8, wherein said sensor mass is a spherical mass adapted for movement in any direction within a plane, said force transfer device further comprises a cam member mounted on a lever for moving said at least one plate into contact with said surface of said second load carrier for locking said load carriers against linear movement with respect to each other, said lever being adapted for activation by said spherical mass, and wherein said force transfer device further comprises a locking gear system comprising a toothed draw rod mounted on said second load carrier and pawl means mounted on said lever for interacting with said toothed draw rod for restricting reverse movement of said draw rod.

10. A linearly adjustable force transfer device according to claim 1, wherein said sensor mass is a spherical mass adapted for movement in any direction within a plane, and said force transfer device further comprises: a cam member mounted on a lever for tilting said at least one plate into contact with said surface of said second load carrier for locking said load carriers against linear movement with respect to each other, said lever being adapted for activation by said spherical mass; and, a locking gear system comprising a toothed draw rod mounted on said second load carrier and pawl means mounted on said lever for interacting with said toothed draw rod for restricting reverse movement of said draw rod.

11. A linearly adjustable force transfer device having inertia-sensitive blocking means for intercepting heavy masses under deceleration forces, said device comprising:

first and second load carriers that are linearly movable with respect to each other;

at least one tiltable plate joined to said first load carrier for tilting movement for bearing against a surface of said second load carrier;

a draw-out sensitive rotatable triggering element for tilting said at least one tiltable plate, thereby locking said load carriers together against linear movement with respect to each other; and a pinion and a travelling gear system coupled to said second load carrier, said second load carrier comprising a draw rod which is activated in the draw-out direction upon acceleration thereof that exceeds a predetermined value.

12. A linearly adjustable force transfer device according to claim 11, further comprising an inertia-sensitive locking mechanism with an inertia-mass activated blocking pawl for engaging a blocking gear system, which is rigid with respect to and rotatable with said rotatable triggering element, said triggering element being connected to a rotating pressure cam for driving said at least one tiltable plate.

13. A linearly adjustable force transfer device according to claim 11, wherein a sensor mass is provided, and said sensor mass and said triggering element are combined into a doubly sensitive blocking mechanism.

* * * * *